UNITED STATES PATENT OFFICE.

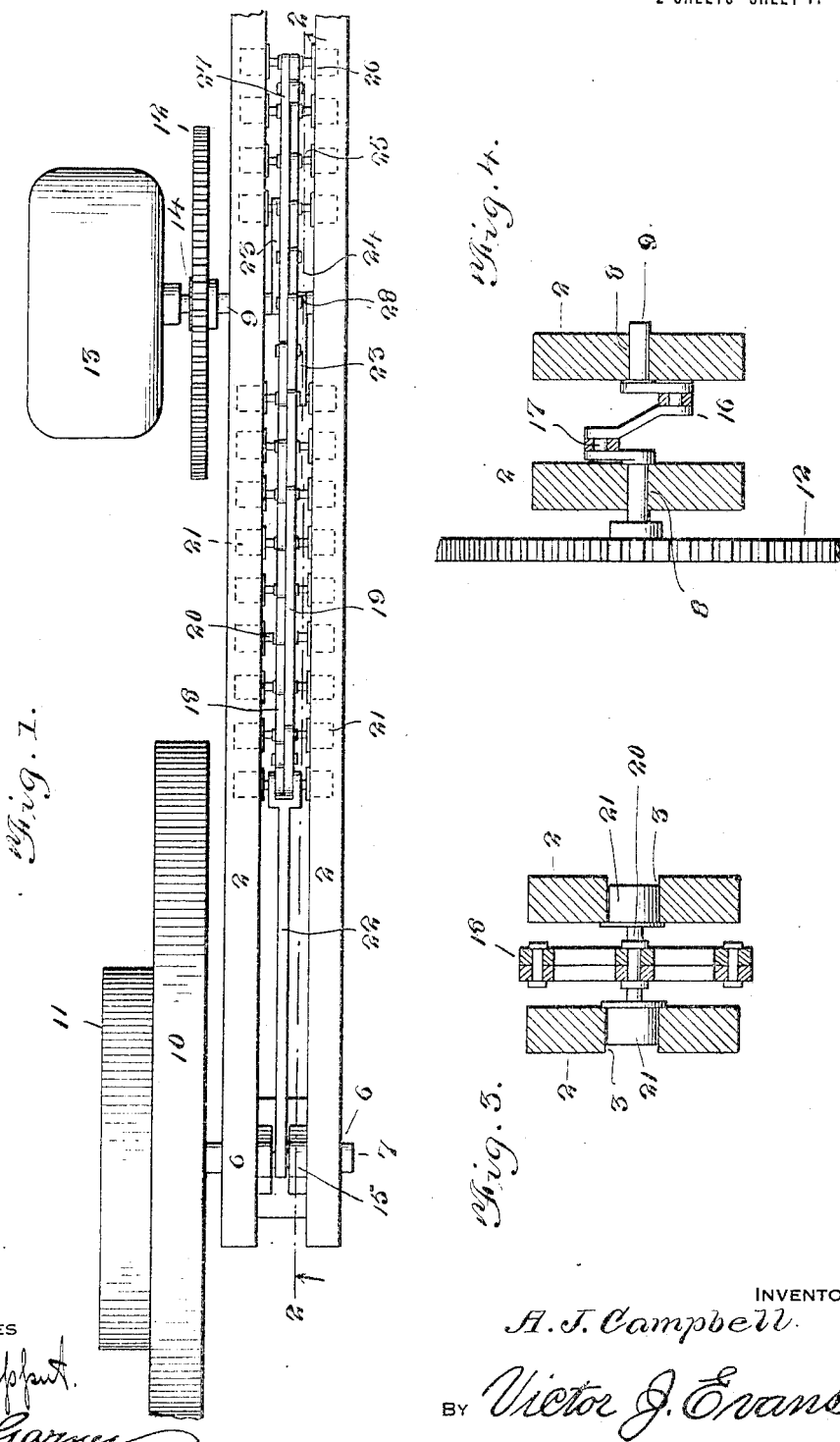

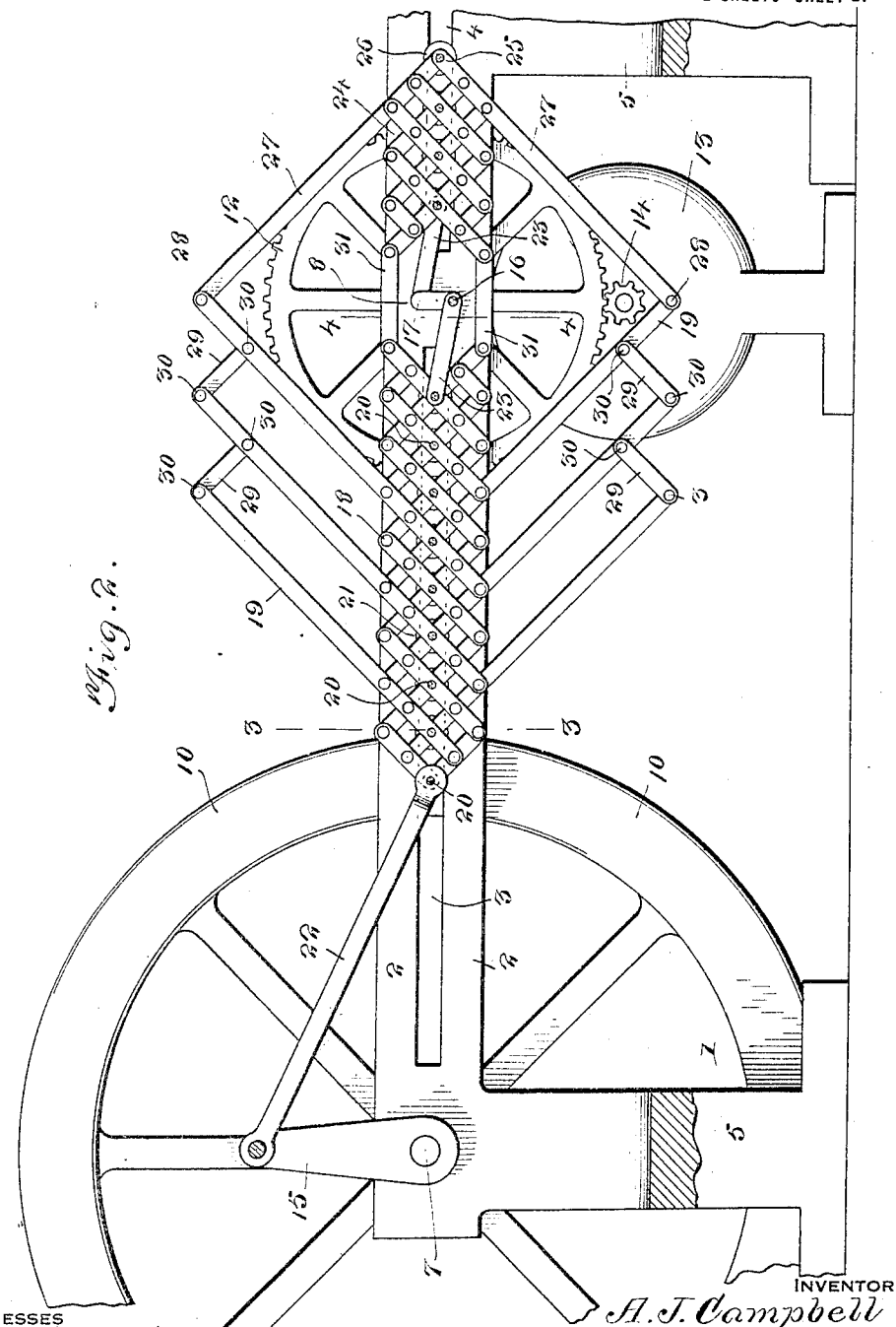

ANDREW J. CAMPBELL, OF WASHINGTON, DISTRICT OF COLUMBIA.

MOTOR MECHANISM.

1,258,533.   Specification of Letters Patent.   Patented Mar. 5, 1918.

Application filed June 20, 1917. Serial No. 175,968.

*To all whom it may concern:*

Be it known that I, ANDREW J. CAMPBELL, a citizen of the United States, residing at Washington, District of Columbia, have invented new and useful Improvements in Motor Mechanism, of which the following is a specification.

This invention is an improved motor mechanism for transmitting motion and increasing power, the object of the invention being to provide an improved motor mechanism of this kind embodying a direct stroke lazy-tongs, an indirect stroke lazy-tongs, means to simultaneously cause the said lazy-tongs to move in reverse directions, levers on the direct stroke lazy-tongs arranged to turn on certain of the pivots thereof, and connecting arms arranged to turn on certain of the pivots of the indirect stroke lazy-tongs and connected to said levers to cause the power of the indirect stroke lazy-tongs to be applied to the direct stroke lazy-tongs.

The invention consists in the construction, combination and arrangement of devices hereinafter described and claimed.

In the accompanying drawings:—

Figure 1 is a plan of a motor mechanism constructed and arranged in accordance with my invention.

Fig. 2 is a side elevation of the same, partly in section, on the plane indicated by the line 2—2 of Fig. 1.

Fig. 3 is a detailed transverse sectional view of the same on the plane indicated by the line 3—3 of Fig. 2.

Fig. 4 is a similar view of the same on the plane indicated by the line 4—4 of Fig. 2.

In the embodiment of the invention here shown a frame 1 is provided which is constructed with a pair of parallel spaced guiding and supporting members 2 each of which is provided with guide slots or ways 3, 4. Said frame is also shown as provided with standards 5 at the ends thereof and as having bearings 6 for a driven crank shaft 7, and bearings 8 for a double crank driving shaft 9. The bearings 6 are near one end of the frame and spaced from the outer ends of the guide slots 3, the bearings 8 being arranged between the guide slots 3 and 4, as shown. The driven crank shaft 7 is here shown as provided with a balance wheel 10 and a power transmitting pulley 11. The driving double crank shaft 9 is shown as provided with a spur gear 12. A motor 13 which constitutes the prime moving element of my motor mechanism has its shaft provided with a pinion 14 which engages the gear 12. The crank of the shaft 7 is indicated at 15 and is of greater radius than the oppositely arranged cranks 16, 17 of the driving double crank shaft 9.

The direct stroke lazy-tongs 18 has certain of its bars provided with extensions 19 which form levers, said levers extending from opposite sides of said lazy-tongs and pivoting or turning on certain of the fulcrums 20 of the bars of said lazy-tongs. The fulcrums 20 also form the axles on which guiding and supporting rollers 21 are mounted, the said rollers being arranged to travel in the slots 3. The fulcrum 20 at the outer end of the lazy-tongs 18 is connected by a pitman 22 to the wrist of the driven crank 15. The fulcrum 20 at the inner end of said lazy-tongs 18 is connected by a link bar 23 to the wrist of the driving crank 16.

The indirect stroke lazy-tongs 24 has the fulcrums 25 of its bars provided with rollers 26 which operate in the slots 4. The outer end bars of the indirect stroke lazy-tongs are formed with extensions 27 which constitute connecting arms. The same are pivotally connected at their outer ends as at 28 to two of the levers 19, the said levers being connected together by links 29 and pivots 30.

The inner end bars of the lazy-tongs 18, 24, are connected together by links 31.

The operation of my improved mechanism is as follows: The pinion 14 which is actuated by the prime motor 13 causes the gear 12 to revolve, together with the double crank driving shaft 9. The lazy-tongs element 18 is actuated by the crank 16 and the lazy-tongs element 24 is actuated by the crank 17, being connected thereto by the link bar 32. Hence the direct stroke lazy-tongs and the indirect stroke lazy-tongs are simultaneously extended or retracted and in opposite directions. The power of the direct stroke lazy-tongs is directly applied to the driven crank or revoluble element 15 by the pitman 22, as will be understood, and the power of the indirect stroke lazy-tongs 24 is applied to the direct stroke lazy-tongs through the instrumentality of the levers 19 and connecting arms 27 so that an increase of the power of the motor mechanism is gained.

While I have herein shown and described a preferred form of my invention, I would have it understood that changes may be made in the form, proportion and construction of the several parts, without departing from the spirit of my invention and within the scope of the appended claims.

Having thus described my invention, I claim:

1. In a motor mechanism of the class described, a revoluble driving element including a pair of oppositely arranged cranks, a revoluble driven element having a crank of greater radius than the driving cranks, a direct stroke lazy-tongs connected to one of the driving cranks and having levers arranged to turn on certain of the pivots of the bars of said lazy-tongs, an indirect stroke lazy-tongs connected to the other driving crank for operation thereby, and connecting arms arranged to turn on certain of the pivots of the bars of the last-named lazy-tongs, said connecting arms being connected to said levers and coacting therewith to impart the power of the indirect stroke lazy-tongs to the direct stroke lazy-tongs.

2. In a motor mechanism of the class described, a revoluble driving element including a pair of oppositely arranged cranks, a revoluble driven element having a crank of greater radius than the driving cranks, a direct stroke lazy-tongs connected to one of the driving cranks and having levers arranged to turn on certain of the pivots of the bars of said lazy-tongs, an indirect stroke lazy-tongs connected to the other driving crank for operation thereby, connecting arms arranged to turn on certain of the pivots of the bars of the last-named lazy-tongs, said connecting arms being connected to said levers and coacting therewith to impart the power of the indirect stroke lazy-tongs to the direct stroke lazy-tongs, and the guiding and supporting means for said lazy-tongs to direct and retain the same in a right line.

3. In a motor mechanism of the class described, a direct stroke lazy-tongs, an indirect stroke lazy-tongs, power means to simultaneously move said lazy-tongs in reverse directions and means to transmit the power of the indirect stroke lazy-tongs to the direct stroke lazy-tongs.

In testimony whereof I affix my signature.

ANDREW J. CAMPBELL.

Copies of this patent may be obtained for five cents each, by addressing the "Commissioner of Patents, Washington, D. C."